Figure 1:
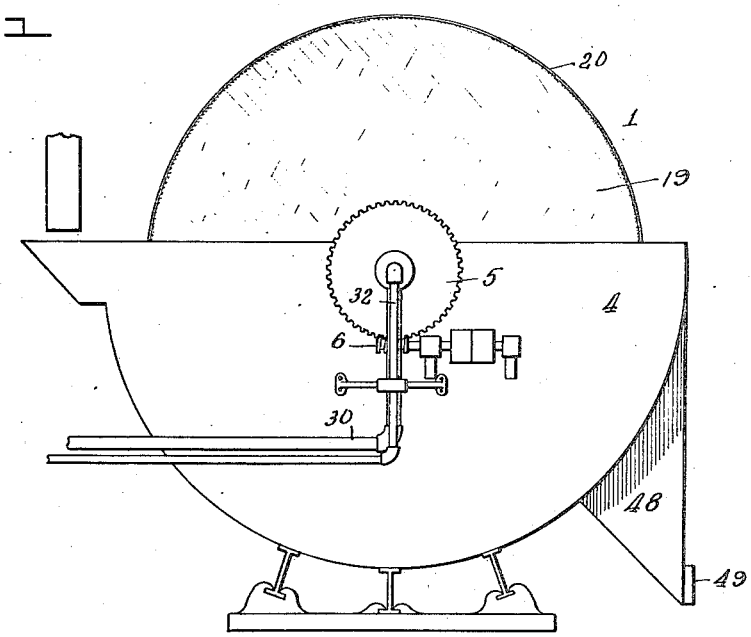

G. J. YOUNG.
FILTER.
APPLICATION FILED JULY 12, 1912.

1,057,475.

Patented Apr. 1, 1913.

5 SHEETS—SHEET 1.

Witnesses
H. G. Rohrietts
R. F. Steward

Inventor
George J. Young

By W. P. McElroy
Attorney

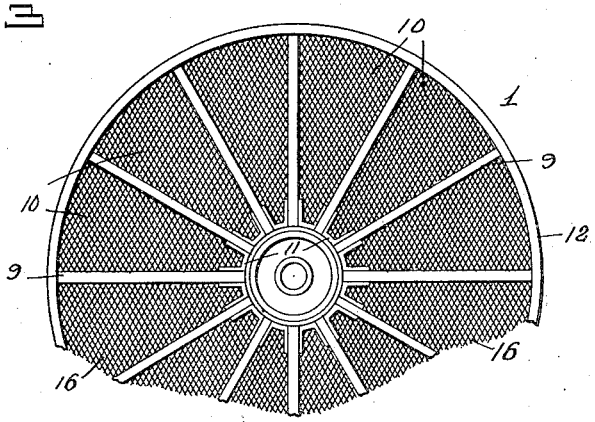
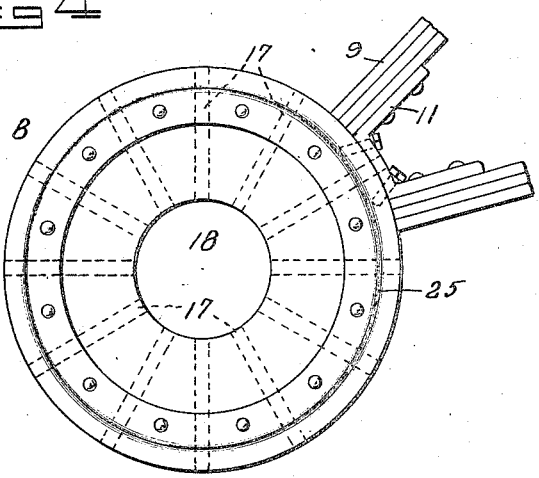
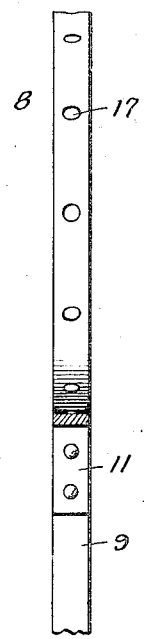
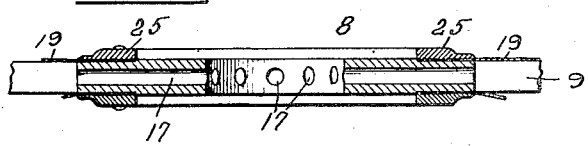

G. J. YOUNG.
FILTER.
APPLICATION FILED JULY 12, 1912.
1,057,475.
Patented Apr. 1, 1913.
5 SHEETS—SHEET 3.
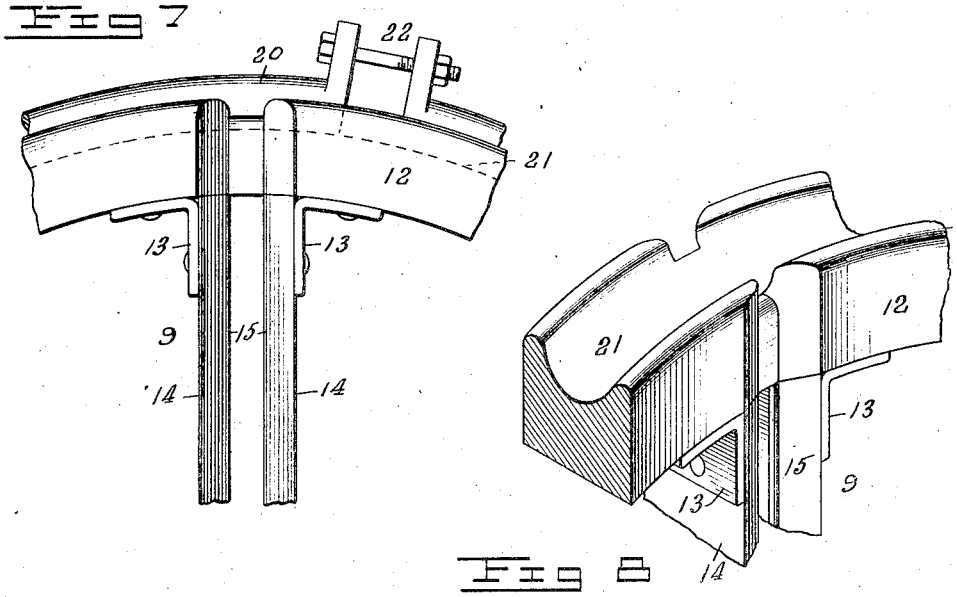
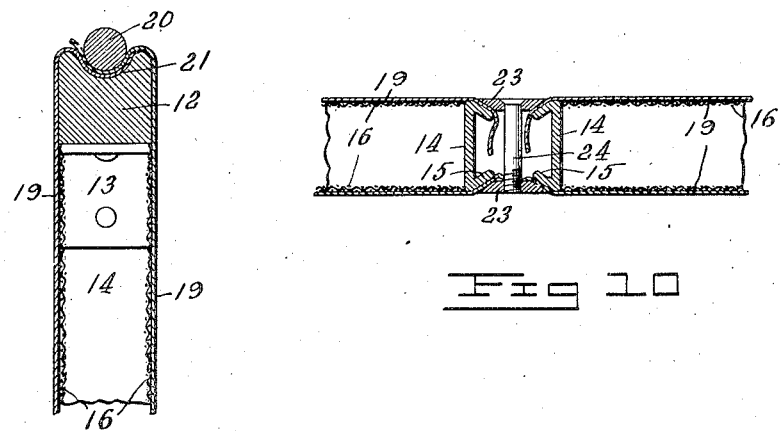
Inventor
George J. Young
By K. P. McElroy
Attorney
Witnesses

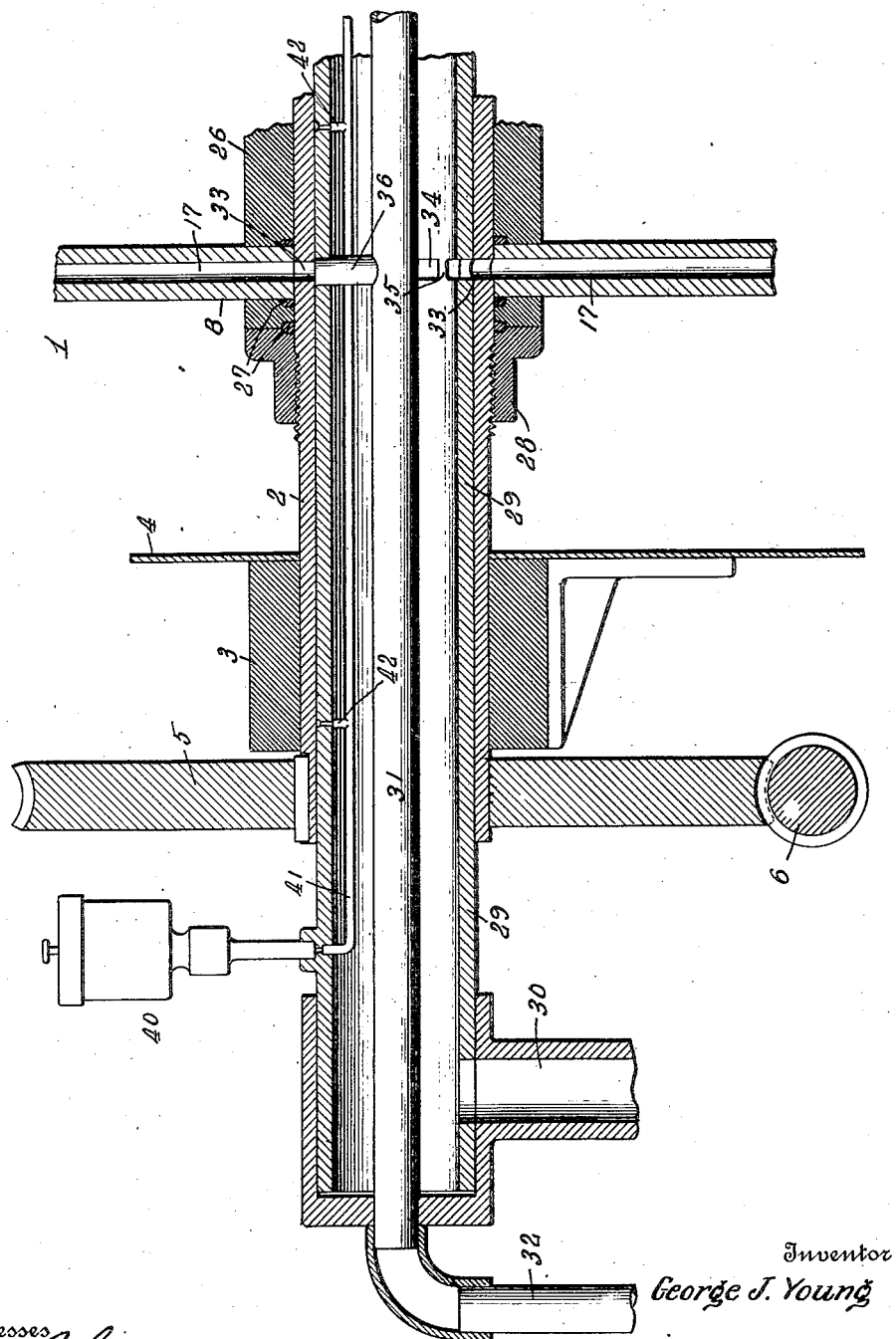

G. J. YOUNG.
FILTER.
APPLICATION FILED JULY 12, 1912.
1,057,475.
Patented Apr. 1, 1913.
5 SHEETS—SHEET 5.
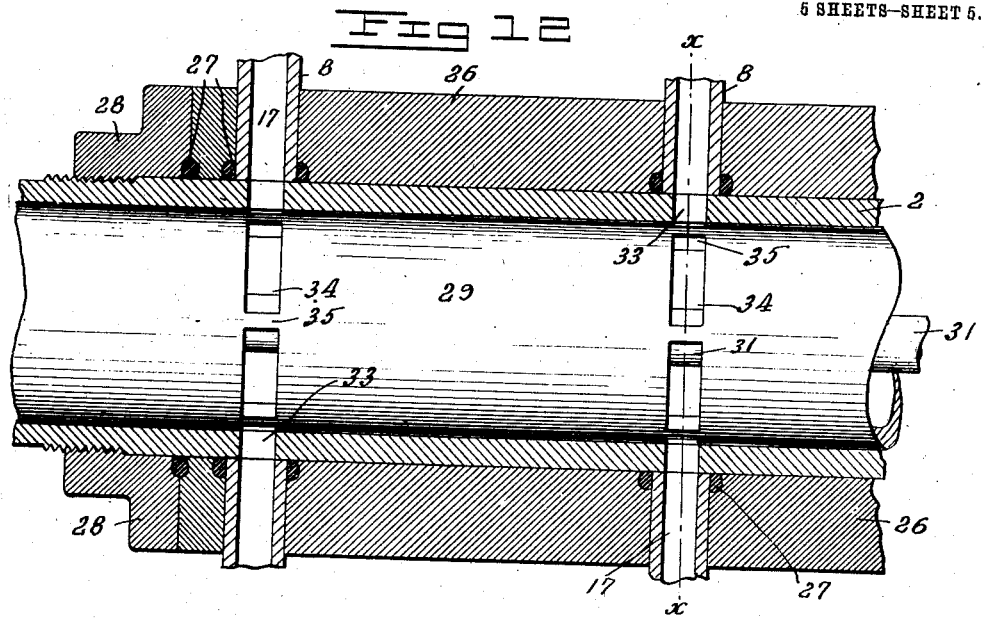
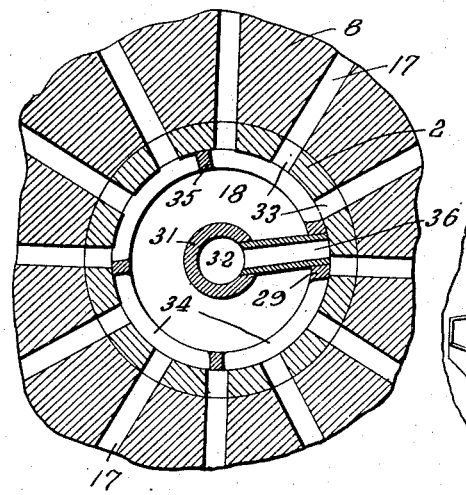
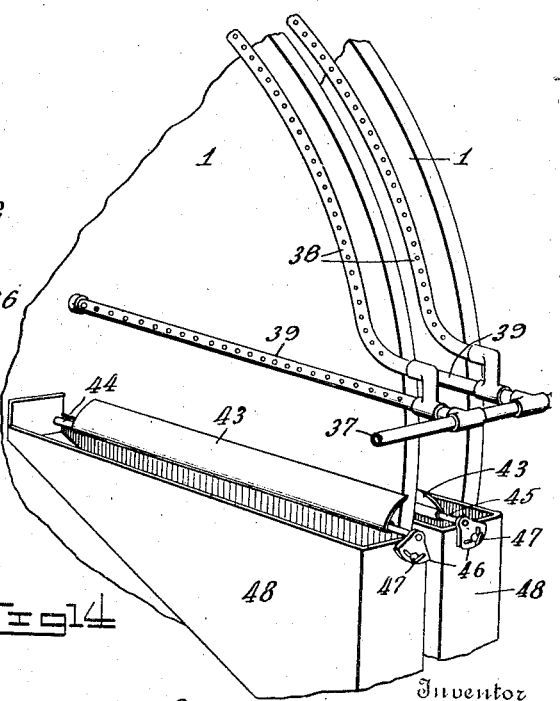
Inventor
George J. Young
By K. P. McElroy
Attorney
Witnesses

UNITED STATES PATENT OFFICE.

GEORGE J. YOUNG, OF RENO, NEVADA.

FILTER.

1,057,475.  Specification of Letters Patent.  Patented Apr. 1, 1913.

Application filed July 12, 1912. Serial No. 709,078.

*To all whom it may concern:*

Be it known that I, GEORGE J. YOUNG, a citizen of the United States, residing at Reno, in the county of Washoe and State of Nevada, have invented certain new and useful Improvements in Filters, of which the following is a specification.

This invention relates to filters, and particularly to filters having continuously moving filtering surfaces arranged to be presented to liquids or semi-liquids, such as slimes and the like, containing finely divided solids in suspension, for the purpose of removing the liquid component of the mixture in clear condition; and it comprises suitably arranged rotatable disk-like filtering units carrying filtering material, means for subjecting part of the interior of each unit to reduced pressure to draw liquid thereinto and to collect separated solids on the exterior thereof, means for subjecting another interior portion of each unit to excess pressure to dislodge collected solids from the outer surface thereof, annular valved means for each unit controlling the application of such reduced and excess pressures, and adjustable means for removing solids from the filtering surfaces; all as more fully hereinafter set forth and as claimed.

In a number of industrial operations it is necessary to treat a mixture of a liquid and finely divided solids in such a manner as to obtain rapid and substantially complete separation of the liquid and solid constituents. This is notably the case in methods of treating ores by cyanidation, where the finely pulverized ore is thoroughly mixed with large quantities of rather dilute solutions of sodium or potassium cyanid to extract the values from the ore. The next step is to separate the liquids from the slimes and pulps resulting from this treatment, and then to suitably treat the separated liquids for the precipitation and recovery of the precious metals dissolved therein. In such processes, there is always a very large quantity of the finely ground exhausted ore to be thus separated; and since the ores ordinarily treated by cyanidation run low in metal values, the commercial success of the process is dependent largely upon the completeness and rapidity of the separation. There are, however, various difficulties encountered in the filtration of solutions and slimes of the character described, and chief among these is the tendency of the excessively finely divided solid material to form a dense and almost impermeable mass or cake on a filtering surface so rapidly as to check the speed of filtration very quickly and to reduce it in a short time below a speed which is economically practicable. On this account many devices have heretofore been proposed in which moving filtering surfaces are employed, and the cakes of solids formed thereon are continuously removed by scrapers of some kind. In some types of apparatus the slimes are drawn against the filtering surface by suction, the liquid passing through, and the cake remaining on the filter face. The filter surface is then moved out of the mass of slimes, and at some later period of filter travel the cake is loosened from the filter by applying air or water under pressure to the opposite side of the filter, thus facilitating the subsequent removal of the cake by a scraper. This application of suction and pressure alternately is perhaps the best of the methods proposed for the treating of pulps and slimes of this character, but in practice it has hitherto been found difficult to construct apparatus to carry out this procedure, one of the most troublesome details having been to provide valve mechanism governing the application of suction and pressure. None of the arrangements proposed heretofore has been wholly satisfactory.

It is one of the objects of the present invention to provide a simple and efficient arrangement of valves for this purpose, and also to provide certain other novel features of construction of great utility and advantage as will appear more fully hereinafter.

Described broadly, the present invention comprises a plurality of disk-like filtering units mounted on a hollow rotatable shaft within which is a second hollow shaft or cylinder which is stationary and which serves as a suction chamber. Suitable bearings for carrying the rotatable shaft are provided and are best arranged at or near opposite sides of a slime-holding tank within which the filtering disks are arranged to dip. Both shafts are provided with suitable sets of ports so arranged as to provide separate annular or cylindrical valve means for each disk-like unit of the apparatus, whereby the interior of the disks may be subjected to reduced or excess pressure at proper periods in the rotation. The interior of each disk is suitably divided into independent cells, each cell having an opening registering with one of the before-mentioned openings in the hollow rotatable shaft to which the disks are attached.

The arrangement of parts may be such as to provide for suction or pressure on any desired proportion of the cells of a disk at once. Ordinarily it is best to apply suction on a cell throughout the time it is submerged in the liquid mixture and for a certain period after emergence, the length of the suction period depending on several considerations. At a later stage, while the cell is out of the body of liquid and usually shortly before it again dips therein, connection of the cell to a source of pressure is made, whereby the cake deposited on the outer surfaces of the disk in its prior passage through the liquid mixture is loosened by pressure as by a short puff of air, for example. The cake thus loosened is then easily removed by scraper means which is best of a type to be described later. In practice about ⅞ths of the rotating disk surface may be under a partial vacuum, while the remaining eighth may be under moderate plus pressure.

The disks may revolve in a half-cylindrical vat which contains the mixture of slime and solution. The slime inflow into this vat is advantageously controlled by a floating check valve so adjusted as to give a supply of material sufficient to keep the lower half of the disk immersed in the pulp at all times. As the disk revolves and a given portion thereof passes through the pulp in the containing vat, the action of the vacuum causes the slime to accumulate in the form of a thin cake on the surface of such portion, the filtered solution draining through the walls of the disk to the hub, whence it flows through the stationary cylinder to an outlet at one end.

During the period that the portion of the disk in question is passing through the air, after leaving the pulp in the vat, the slime cake is best washed by being subjected to the action of sprays of water and under the displacing action of the inwardly drawn air and water the solution contained in the cake is removed. Just before the revolution of the disk brings this portion thereof again into the slime the vacuum is cut off automatically therefrom and compressed air is admitted to that section of the disk, blowing or lifting the slime cake so that an adjustable scraper may remove it and cause it to be discharged into chutes on either side of the disk. Immediately after the latter operation the compressed air is cut off and connection with the vacuum is again made and is maintained up to the time of removing the slime cake as before described.

In the accompanying drawings I have shown more or less diagrammatically certain embodiments of apparatus elements within the present invention.

Figure 2:
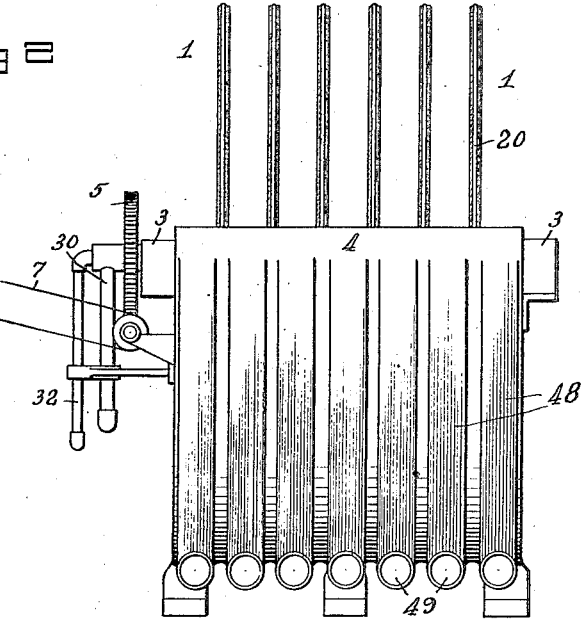

In this showing, Figure 1 is a view of an end elevation of the apparatus; Fig. 2 is a general view of the same in side elevation; Fig. 3 is a view of one of the filtering disks without the filter-cloths; Fig. 4 is an enlarged view of a disk hub, showing the method of attaching the disk spokes thereto; Fig. 5 is a cross section of the hub of Fig. 4 on a diameter; Fig. 6 is an end view of Fig. 4; Fig. 7 is a fragmentary detail in elevation of a disk periphery; Fig. 8 is a similar view in elevational perspective; Fig. 9 is a cross section of a disk periphery showing the method of attaching filter cloths thereto; Fig. 10 is a cross section of a compound disk spoke showing the method of attaching filter cloths thereto; Fig. 11 is a fragmentary sectional view of one end of the apparatus showing an arrangement of hollow shafts and the method of lubrication herein preferred; Fig. 12 is a fragmentary longitudinal section showing in detail the arrangement of cylindrical valves for the filtering disks; Fig. 13 is a cross-section on the line X—X of Fig. 12; and Fig. 14 is an elevational perspective showing a disk with its accompanying scrapers and troughs.

Referring to the drawings, filtering disks 1 are mounted on a rotatable hollow shaft 2 journaled in bearings 3 mounted at the ends of a semi-cylindrical tank 4 containing the liquid or semi-liquid mixture to be filtered. This shaft may be rotated by any suitable means such as worm wheel 5, meshing with worm 6, the worm being driven through belt 7 taking power from any suitable source, (not shown). Each disk or filtering unit comprises a hub 8 to which are secured spokes 9 of special construction dividing the disks into any suitable number of sectors or panels 10, each of which constitutes an independent cell. In the present instance twelve of such filter cells are shown for each disk. The spokes are joined to the hub by angle braces 11 and at their outer ends are joined to a rim 12 by means of angles 13. Each spoke is made up of a pair of channels or channel-like members 14, the arms 15 of the channels being bent inwardly toward each other as indicated, and the channels being arranged with the channeled sides adjacent. The disk framework comprising the spokes, rim and hub before described, should be of as light construction as is consistent with the necessary strength and durability of the apparatus. Each cell is provided on its opposite faces with wire netting 16 attached to the cell frame and substantially flush with the sides of the spokes. This netting serves to support the filtering material employed. Outlets 17 passing through the hub connect each cell with the central opening 18 therethrough.

The filter covering for each cell comprises canvas or other suitable filtering material, or a combination of coarse and fine canvas cloths 19, supported on the wire netting before mentioned. These cloths are best applied, one to each face of each filtering cell, the peripheral margins of the cloths being lapped over the outer edge of the cell and held in place by a ring or circular rod 20 lying in peripheral groove 21 of the disk frame and arranged to be drawn tight by a bolt and nut device 22 connecting the separable ends of the ring. The cloths may be secured to the spokes in the manner clearly shown in Fig. 10. The edges of the cloths being lapped over the sloping channel arms of the spokes are held in place by means of beveled strips 23, which are drawn together by means of bolts or screws 24. The cloths may be held to the hubs by suitable collars 25. The disks are arranged, as before stated, on the hollow shaft and are spaced apart by means of distance pieces 26, suitable gasket means 27 being provided to secure tight joints. Collars 28 screw onto opposite ends of the shaft and secure disks, distance members, and gaskets firmly together. The arrangement is such that the central shaft can be readily stripped of the disks and the disks may be replaced thereon with little trouble.

Snugly fitting within the hollow shaft (2) is arranged a stationary hollow shaft or cylinder 29. The entire weight of the moving cylinder is best borne by the bearings (3). Passage 30 leading from this hollow cylinder connects with an air pump or injector whereby suction may be applied to the interior of the cylinder. Pipe 31 arranged centrally of the stationary cylinder takes air under pressure through inlet passage 32. The application of reduced pressure, or vacuum and excess pressure to desired portions of the filtering units or disks is controlled by an arrangement of parts which constitutes a series of what may be termed cylindrical or annular valves, there being one such annular valve for each disk. Registering with each of the outlet bores or channels (17) in the disk hubs, there is provided an opening 33 in the rotatable shaft upon which the disks are rigidly mounted. At suitable intervals, corresponding to the distance between the disks, the stationary cylinder (29) is provided with slots 34 which may by suitable accessory arrangements be continuous over a certain proportion of the cylinder periphery, or which, as shown here, may be interrupted by bridging or connecting members or webs 35. These bridging or connecting members are somewhat less in width than the openings (33) so that the openings cannot be entirely closed thereby. Each of these slots is substantially in planar alinement with a set of openings 33 and channels 17 affording communication with the corresponding disk. As here illustrated, these slots extend around about ⅝ths of the cylinder periphery, and each cell of the rotating disks is therefore in communication with the suction chamber during about ⅝ths of its rotational travel. A branch passage 36 leads from the central pressure pipe to the periphery of the stationary cylinder, and each disk cell as the inner end of its outlet registers with the end of this branch passage receives a puff of compressed air. The arrangement just described is, as before mentioned, provided for each rotating disk. As the shaft revolves, the segments of a disk are under vacuum until they pass over the branch passage leading to the pressure pipes, and at this point air under pressure is blown in and the cake on the filtering surface of the cells is dislodged. Suitable means for washing the cake well after such cell emerges from the semi-cylindrical tank may be provided. For example water may be supplied through a main 37 having a pair of branches extending between each pair of filtering disks. Both of these branches are provided with suitable perforations, one branch, 38, being curved to follow substantially the periphery of the disk while the other branch 39 may extend directly inwardly. The washing means may be variously modified or, in some cases, may be dispensed with.

A very advantageous feature of the present invention is the provision of suitable lubricating means between the rotating hollow shaft and the stationary cylinder with which it contacts. From sight feed lubricator 40, mounted on the stationary cylinder leads tube 41 which extends longitudinally within the cylinder and which has, at suitable points, branches 42 leading to bores through the cylinder wall. Oil may be thus supplied to the contacting surfaces of the localities between the disks as may be desired.

Scrapers 43 are arranged in pairs, one on each side of each disk, said scrapers being adjustably supported by rods 44 and 45 extending therefrom and bearing on portions of the tank frame. Rod 45 carries rigidly connected thereto a slotted sector 46 through which passes set screw or clamp 47. By loosening this clamp the scraper may be adjusted relative to the disk and held in position by tightening the clamp. Immediately below each scraper is an inclined chute 48 which extends downwardly and passes through the side of the tank, and which is provided at its lower end with a discharge outlet 49. The slope of these chutes should be sufficient to readily discharge the cake. If desired, removal of the cake from the chutes or troughs may be facilitated by the use of mechanical devices such as screw conveyers and the like or the cake may be flushed out of the troughs by means of streams of water or by any other suitable means desired.

The operation of the apparatus is sufficiently obvious from the foregoing description. The mixture of solution and slime being placed in the semi-cylindrical tank, the rotary shaft bearing the filtering disks is caused to rotate at the proper speed. Each cell of a disk enters the solution to be filtered and passes therethrough under a partial vacuum, the solution being drawn through the cloths into the cells and thence through the outlets in the hub and rotating cylinder through the suction slot of the stationary cylinder and into the suction chamber within said cylinder. The solution then passes out through the suction passage at the end of the stationary cylinder. The solid material contained in the liquid to be filtered is caught by the filter cloths covering the disk cells and forms a cake thereon, being firmly held on the disk by reason of the suction applied to the cells. Upon emerging from the tank, each cell bearing its cake of separated solids is sprayed by the wash pipes and finally reaches the point in the circuit where the pressure port forming a part of the cylinder valve arrangement registers with the outlet from the cell. At this point air under moderate pressure enters the cell with a sudden puff which dislodges the cake to a greater or less extent from the outer surfaces of the cell. The parts are so arranged that this dislodging action occurs just before the cell reaches the adjustable scrapers, and the partially dislodged cake is thus easily scraped off by the scrapers and falls into the inclined chutes and is discharged therefrom outside the tank.

What I claim is:—

1. Apparatus for filtering slimes and the like comprising a hollow rotatable shaft supported on suitable bearings, a plurality of disk-like filtering units mounted thereon, each of said units being suitably divided into a number of independent cells connected with the interior of said hollow shaft by passages opening into said shaft in annular arrangement, a hollow stationary shaft or cylinder fitting snugly within said rotatable shaft and provided with suction apertures or slots extending around a portion of its periphery and arranged to register with the inner ends of the passages in said filtering units, suction or pressure-reducing means communicating with the interior of said stationary cylinder, a compressed air conduit extending longitudinally within said cylinder, and branches leading from the conduit to the outer surface of the said cylinder and terminating in pressure apertures substantially in line with said suction apertures.

2. Apparatus for filtering slimes and the like comprising a plurality of disk-like filtering units, each of said units comprising a plurality of radially extending cells each provided with an outlet communicating with a passage extending inwardly through an annular collar or hub secured to said radial cells, means extending through the hubs of said filtering units and rotatably supporting the same, such supporting means being provided with a set of annularly arranged apertures or ports for each said disk, and said ports being arranged to register with the inner ends of said passages through the respective hubs, suction means communicating with some of said ports in each set, pressure means communicating with another port or ports in each set, and means for rotating said filtering units.

3. Apparatus for filtering slimes and the like comprising a plurality of disk-like units mounted to rotate in close engagement with a stationary hollow cylinder extending therethrough, each said filtering unit comprising independent cells provided with outlet passages terminating in annularly arranged ports or apertures substantially in planar alinement with a set of peripheral ports in said stationary cylinder and arranged to register therewith during rotation, pressure means communicating with at least one of said peripheral ports in each set, and suction means communicating with said hollow cylinder.

4. In a rotary filter, a rotatably mounted filtering unit, an adjustable scraper adjacent the filtering surface thereof, said scraper being pivotally mounted on suitable supporting means and carrying a slotted sector, and means mounted on said supporting means and engaging the slot in said sector for adjusting the position of said scraper relative to said filtering surface.

5. In a rotary disk filter, a disk-like filtering unit comprising a central hub, arms or spokes supported thereby and extending radially therefrom, each such spoke comprising a pair of substantially parallel members spaced apart, strips arranged to bridge the space between the members of each such pair and to clamp filtering material thereagainst, and means for holding said strips tightly against said members.

6. In a rotary disk filter, a disk-like filtering unit comprising a central hub, arms or spokes supported thereby and extending radially therefrom, each such spoke comprising a pair of substantially parallel members spaced apart, strips arranged to bridge the space between the members of each such pair, means for holding said strips against said members, a rim connecting the outer ends of said spokes and provided with a peripheral groove, and an adjustable member arranged to secure the edges of filtering material in said groove.

7. In a rotary disk filter, in combination, a disk-like filtering unit having a framework comprising a central hub, a rim, spokes extending between said hub and said rim and dividing the filtering unit into a plurality of shallow cells, a pair of clamping strips engaging oppositely disposed lateral slots in each of said spokes to secure filtering material in place, and adjustable means for holding said strips in position.

8. In a rotary disk filter, a disk-like filtering unit comprising a framework comprising a central hub, a rim, spokes extending between said hub and said rim and dividing the filtering unit into a plurality of shallow cells, a pair of clamping strips engaging oppositely disposed lateral slots in each of said spokes and provided with adjustable securing means, a pair of oppositely disposed clamping annuli or collars adjacent the inner ends of said spokes, a clamping ring arranged to engage a peripheral groove in said rim, and filtering material covering the opposite faces of said filtering unit and held thereagainst by said strips, collars and ring.

9. In a rotary disk filter, a disk-like filtering unit comprising a framework comprising a central hub, a rim, spokes extending between said hub and said rim and dividing the filtering unit into a plurality of shallow cells, filter-supporting walls of metal netting or the like laterally inclosing each such cell, a pair of clamping members engaging oppositely disposed lateral openings in said spokes and provided with adjustable securing means, a clamping member arranged on each face of said filtering unit near the hub, a clamping ring engaging the outer periphery of said rim, means for adjusting the tension of said ring, and filtering material covering the opposite faces of said filtering unit and held thereagainst by said strips, collars and ring.

10. In a rotary disk filter, in combination, a stationary hollow cylinder provided with a set of peripheral suction and pressure ports, and a filtering disk revolubly mounted thereon and comprising a plurality of independent filtering cells, each cell being provided with a passage extending radially inward to said cylinder in alinement with said set of ports and arranged to register with said ports successively as the disk revolves.

In testimony whereof, I affix my signature in the presence of two subscribing witnesses.

GEO. J. YOUNG.

Witnesses:
H. O. WICKS,
L. H. POSTLEWAITE.